United States Patent [19]

Hideshima et al.

[11] 4,183,462
[45] Jan. 15, 1980

[54] FAULT DIAGNOSIS APPARATUS AND METHOD FOR SEQUENCE CONTROL SYSTEM

[75] Inventors: Keiji Hideshima, Yamato; Naoki Sasaki, Zama; Masaoki Takaki, Hitachi, all of Japan

[73] Assignees: Hitachi, Ltd.; Nissan Motor Company, Limited, both of Japan

[21] Appl. No.: 878,017

[22] Filed: Feb. 15, 1978

[30] Foreign Application Priority Data

Feb. 25, 1977 [JP] Japan .................................. 52-19173

[51] Int. Cl.² .............................................. G06F 11/00
[52] U.S. Cl. .................................................... 235/304
[58] Field of Search ............................. 235/301, 304; 340/146.1 AB; 364/119; 328/75, 130

[56] References Cited

U.S. PATENT DOCUMENTS

| | | | |
|---|---|---|---|
| 3,225,205 | 12/1965 | Berkin | 340/146.1 AB |
| 3,320,440 | 5/1967 | Reed | 340/146.1 AB |
| 3,713,095 | 1/1973 | McPherson | 340/146.1 AB |
| 3,899,665 | 8/1975 | Gaon | 235/301 |
| 3,939,453 | 2/1976 | Schroeder | 235/304 |
| 4,023,109 | 5/1977 | Shreve | 235/301 |

*Primary Examiner*—Charles E. Atkinson
*Attorney, Agent, or Firm*—Craig and Antonelli

[57] ABSTRACT

A method and an apparatus for diagnosing a fault in a sequence control system performing control in accordance with a predetermined sequence, wherein memory means having bits corresponding to respective ones of a plurality of predetermined sequence steps is provided. The sequence of steps actually applied to an object to be controlled are sequentially stored in corresponding bits. Each time a sequence step is applied to the object to be controlled, the contents of the memory means are checked to see whether or not any of the sequence steps applied thus far have been skipped. If any sequence step has been skipped, a fault is determined. Preferably, a fault is also determined when any of the intervals of sequence steps successively applied exceeds a predetermined length of time. Upon determination of a fault, the sequence step associated with the fault is identified, and the control circuit associated with the sequence step in fault is preferably displayed.

12 Claims, 8 Drawing Figures

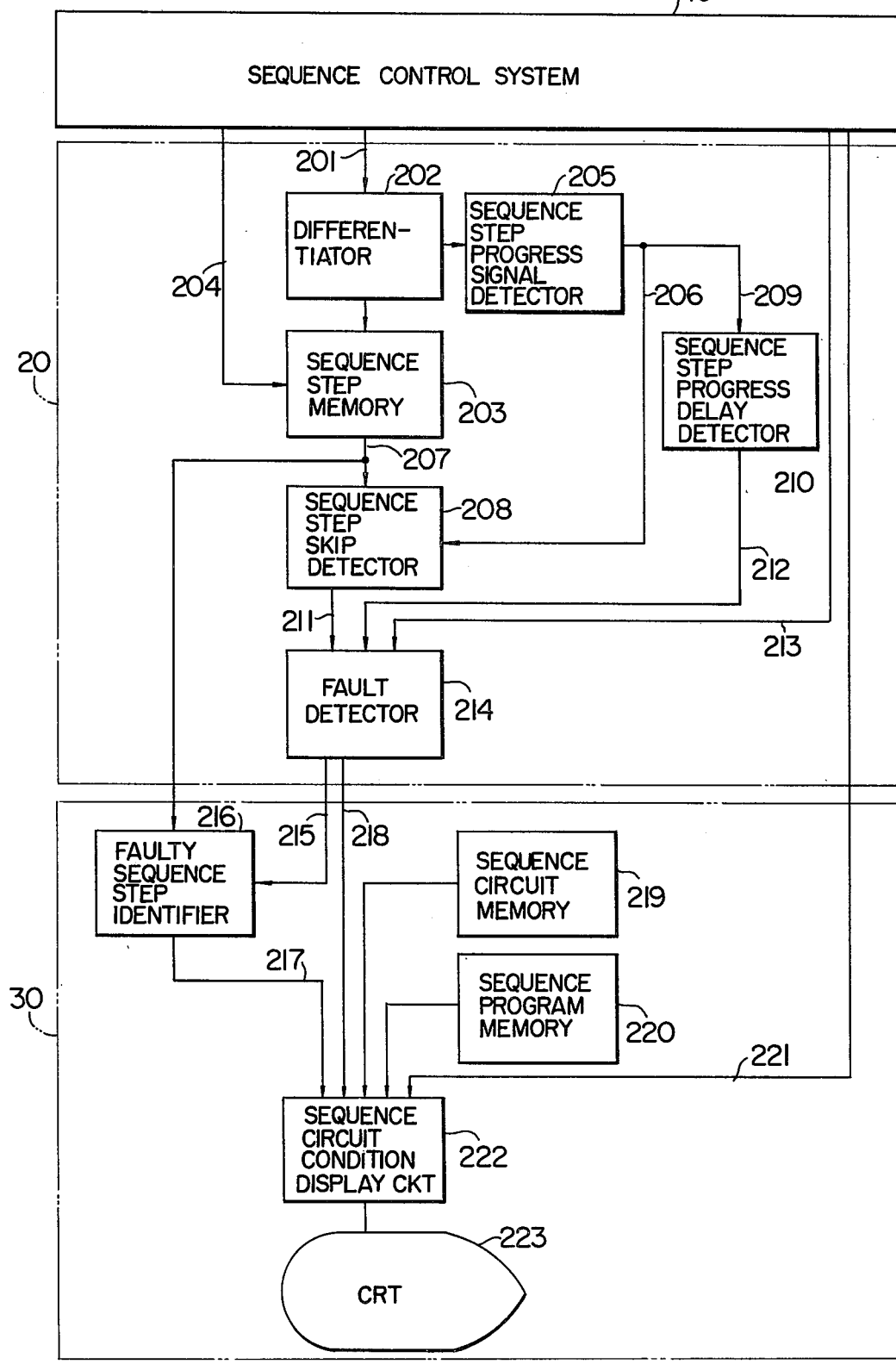

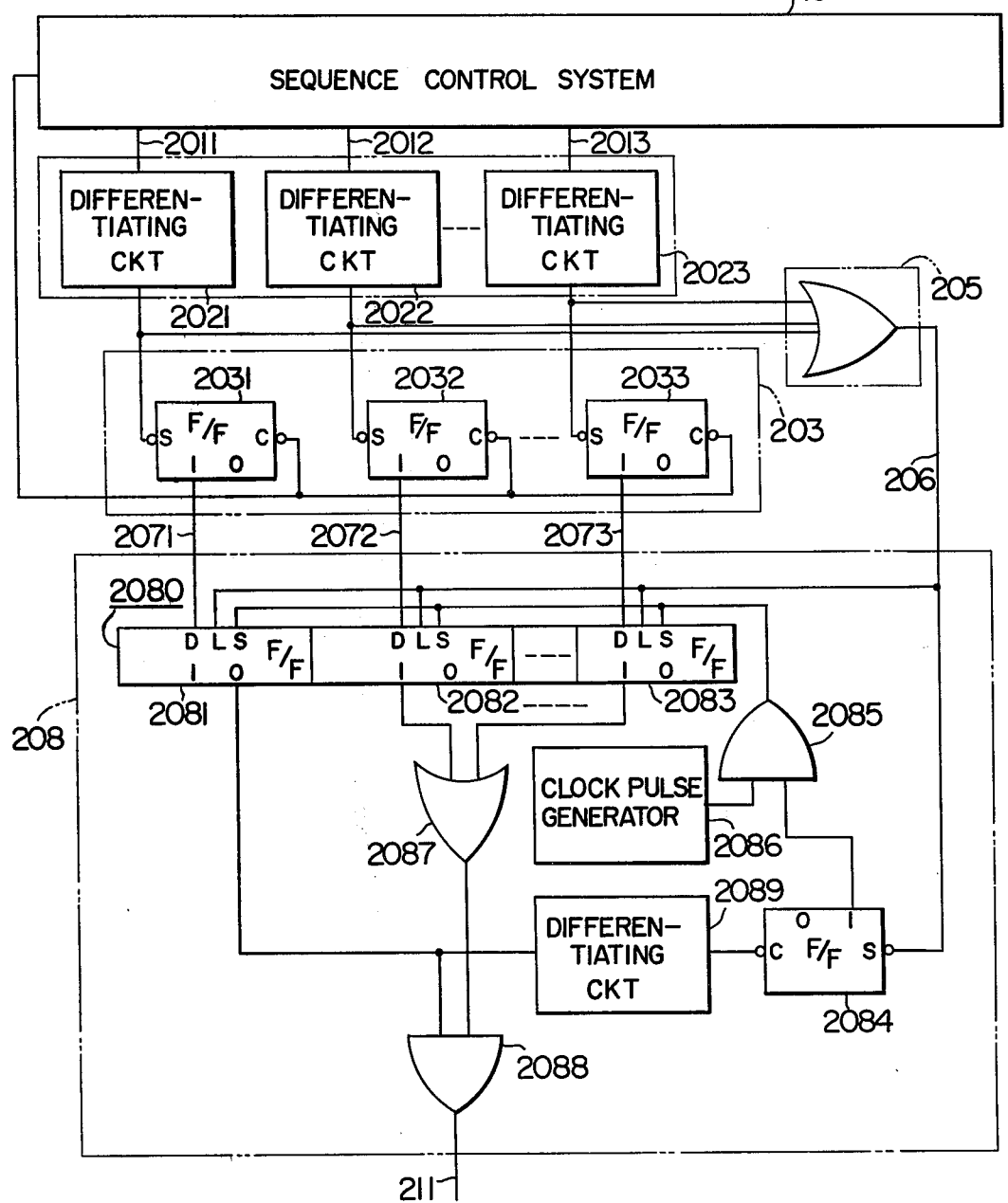

FAULT DIAGNOSIS APPARATUS AND METHOD FOR SEQUENCE CONTROL SYSTEM

LIST OF PRIOR ART REFERENCE

The following reference is cited to show the state of the art:

U.S. Pat. No. 3,952,944, Koyanagi et al., Apr. 27, 1976, Cl. 235-92.

BACKGROUND OF THE INVENTION

This invention relates to a sequence control system, or more in particular to an apparatus for automatically diagnosing a fault of devices to be controlled.

Conventionally, relay logic circuits, PLC (programmable logic controllers), or the like are used as sequence control systems. These sequence control systems are used for such applications as control of production processes. The production processes include at least one production line or usually several production lines. Although the sequence control system is ordinarily installed in the vicinity of such production lines, it has a high reliability in operation because of the location thereof in an environment protected from direct interference by an article in the production lines, sparks, or water. However, external sensors, such as limit switches, which supply the control system with input signals indicating the operational status, are installed within the related production lines per se and therefore liable to be disabled by impact with an article in production, sparks or water. A mis-operation of any one of such external sensors makes normal sequence control operation impossible, resulting in a fault in the system. In the case of a large-scale system including as many as several thousands of such external sensors which generate the input signals applied to the sequence control system, it is almost impossible to find the sensor which is faulty. A fault in even only one of the sensors places the whole system out of order.

Several types of method/apparatus for diagnosing an abnormal condition of the sensors which supply the sequence control system with input signals indicating the operating status of the object to be controlled have so far been suggested. They are known as (1) the process delay detection method, (2) the prohibited pattern checking method, and (3) the sequence circuit condition display method.

In the process delay detection method of (1), a time chart by which sequence steps are normally followed is stored as a reference time chart. The actual operational status is compared with the reference time chart, and if the timing difference between them exceeds a certain limit, a warning is given against an abnormal operation. The disadvantage of this method is that although the occurrence of a fault is detected, the sequence step where the erroneous condition exists or the fault has occurred can not be identified.

The prohibited pattern checking method of (2) is for checking whether or not a condition which should never occur under normal conditions has occurred. According to this method, a pattern which should never occur or a prohibited pattern is stored in advance, and a check is made to see whether or not such a pattern of condition exists for fault diagnosis. In spite of the advantage that once a prohibited pattern is present, the external sensor in which there is a problem is immediately identified, the probability of occurrence of a fault belonging to such a prohibited pattern is very small. The use of this method alone, therefore, is not very effective in fault diagnosis.

In the sequence circuit condition display method of (3), upon the occurrence of a fault, the status of suspicious sequence circuits (opened or closed conditions of contacts) included in the circuits is displayed on a circuit diagram in order to find a faulty part by presumption. The shortcoming of this method is the requirement of human presumption of the problem part.

SUMMARY OF THE INVENTION

Accordingly, it is an object of the present invention to eliminate the disadvantages of the conventional methods/apparatuses and to shorten the time required for fault diagnosis on the one hand and to make fault diagnosis even by an inexperienced worker possible on the other hand, by automating the presumption of fault location which has so far been made by the operator.

According to the present invention, there is provided a fault diagnosis method and apparatus wherein by monitoring the progress of the sequence steps, identification of the sequence step where a fault has occurred may be facilitated, and in the case of any abnormal progress of sequence steps, the sequence step in trouble may be indicated.

The objects other than those mentioned above, features and advantages of the present invention will become apparent when reading the detailed description below with reference to the accompanying drawings.

BRIEF DESCRIPTION OF THE DRAWINGS

FIG. 3 shows a configuration for explaining the operation of an embodiment of the present invention.

FIG. 4 is a circuit diagram for explaining an embodiment of a sequence step skip detector circuit according to the present invention.

DETAILED EXPLANATION OF THE INVENTION

For better understanding of the present invention, the above-mentioned prohibited pattern checking method and the sequence circuit condition display method will be illustratively described below more in detail, in advance of the description of the present invention.

Figure 1:
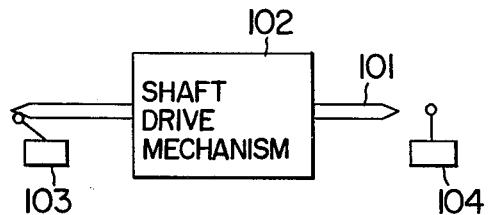
FIG. 1 is a diagram for explaining an example of a conventional prohibited pattern checking method.

An example of the prohibited pattern checking method is shown in FIG. 1. In FIG. 1, a shaft 101 is reciprocated laterally by a shaft drive mechanism 102. The left and right limits of motion are detected by limit switches 103 and 104 respectively. In this system, it is impossible for both of the limit switches 103 and 104 to be closed simultaneously under normal operating condition. If they are both closed, then, it indicates a fault. According to the prohibited pattern checking method, this kind of pattern (prohibited pattern) which should never occur is stored in advance and checked. The shortcomings of this method have already been mentioned above.

Figure 2A:
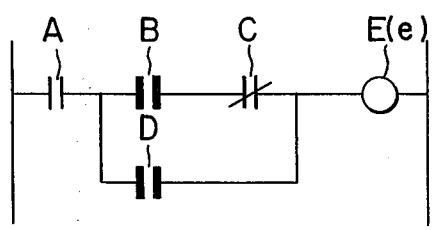
FIGS. 2A and 2B are diagrams for explaining examples of conventional fault diagnosis by display of the operating condition of a sequence circuit diagram.
Figure 2B:
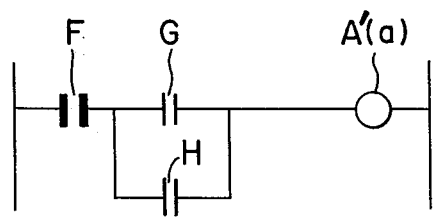

The processes of search for a fault by the conventional sequence circuit condition display method are illustratively shown in FIGS. 2A and 2B. Assume that the system becomes faulty for some obscure reason, and that an experienced operator has inferred by his experience or sixth sense that "the fault is probably due to the lack of an output signal e". In order to know whether the output e is really absent, or if so, why it is absent, the condition of the sequence circuit which should produce the output e is displayed on a display means such as a cathode ray tube (CRT). A diagram of the circuit including, for example, a relay E which should generate the output signal e and contacts A, B, C and D connected to the relay E, with the open and closed condition of the contacts, is displayed on the CRT. By way of convenience, the contacts not actuated are shown by thin lines and those actuated by thick lines as illustrated in FIG. 2A. In the case of FIG. 2A, a normally-open contact A is not actuated and therefore left open, normally-open contacts B and D are actuated and kept closed, and a normally-closed contact C is not actuated and kept closed. As a result, the coil of the relay E which should produce the output e is not excited because the normally-open contact A is not closed. The condition of the sequence circuit producing an output a for actuating the contact A to close is then displayed on the CRT screen as shown in FIG. 2B. It is made clear that the absence of the output a is attributable to the non-excitation of the coil of a relay A', which in turn is caused by the non-conduction of both the normally-open contacts G and H. As a result of checking the respective limit switches including the contacts G and H, it may be found that the limit switch, for example, including the contact G is out of order. The disadvantage of this method, as mentioned above, is the requirement for the operator to presume a fault point. This method has greatly contributed to saving diagnosis time by display of a circuit diagram on the CRT screen in view of the fact that before this method was established, it had been necessary for fault diagnosis to check the closed or open state of each relay separately. In spite of this advantage, this method essentially provides only backup data for analysis and the operator is required to presume the location of a fault point. This presumption requires considerable skill and intuition.

The present invention will be explained below with reference to a preferred embodiment.

A basic general configuration of a preferred embodiment of the invention is shown in FIG. 3. A fault detector 20 is successively impressed with signals representing various sequence steps produced from a sequence control system 10. Whenever a fault is detected, the sequence step where the particular fault occurs is identified and displayed by a fault diagnosis display section 30. In the drawing, arrows show the directions of signal flow. A sequence control output signals 201 successively applied to an object (not shown) to be controlled from the sequence control system 10 in accordance with predetermined sequence steps are applied also to a fault detector 20 at the same time. The rise portion of each sequence control output signal 201 is detected by a differentiator circuit 202 and then a pulse signal representing the rise portion is applied to the corresponding one of the addresses or bits of a sequence step memory circuit 203, so that the steps already accomplished among the predetermined sequence steps are stored in the corresponding addresses or bits of the memory circuit 203. By checking all the addresses or bits of the memory circuit 203, therefore, it is possible to detect up to which sequence step among the predetermined sequence steps has the process been accomplished and whether there is any step skipped or not. When, with the progress of sequence processes, a cycle of processes, namely, all the predetermined sequence steps are accomplished, the sequence step memory circuit 203 is reset by being impressed with a sequence step memory reset signal 204 produced from the sequence control system 10, indicating the end of a cycle. Under normal operating conditions, the accomplished sequence steps are sequentially stored in corresponding addresses or bits of the sequence step memory circuit 203, and upon the termination of a sequence cycle, the information of the memory circuit 203 is reset in response to the reset signal 204. This process is repeated.

A sequence step progress signal detector circuit 205 is for passing the output signal of the differentiator circuit 202 which indicates the detected rise portion of the control output signal 201. The signal that has passed the circuit 205 is applied to a sequence step skip detector circuit 208 as a signal 206 for providing timing when a check is to be made as to whether there is any skip of sequence step among the processed sequence steps. The skip detector circuit 208, in response to the timing signal 206, receives from the sequence step memory circuit 203 a sequence step progress information signal 207 representing the contents thereof or the processed sequence steps so as to check whether the sequence steps are proceeding properly without skipping. If any abnormal progress is detected, a sequence step progress error signal 211 is produced from the sequence step skip detector circuit 208 and then applied to a fault detector circuit 214.

The output signal 206 of the sequence step progress detector circuit 205 is also applied to a sequence step progress delay detector circuit 210 as a signal 209 indicating the progress of one sequence step. The sequence step progress delay detector circuit 210 may be a so-called "watch-dog timer" for producing an output signal in the absence of a step progress signal 209 indicating the initiation of another sequence step within a predetermined period of time from the starting point of the preceding sequence step. The timing set for the watch-dog timer 210 usually has some margin in addition to the maximum length of time required for progress of each sequence step. (It is of course possible to set different timings for individual sequence steps but it complicates the construction and is not very effective.) As long as the object to be controlled operates normally, the sequence step progress signal 209 is applied within the predetermined period of time to reset the timer 210 so that the timer 210 restarts time setting, without producing a delay alarm signal 212 which indicates the occurrence of delay in progress of sequence steps. When a fault occurs in the object to be controlled so that progress of the sequence steps is delayed, the sequence step progress signal 209 can not be applied to the circuit 210 within the preset period of time and therefore the sequence step progress delay detector circuit 210 is allowed to produce the delay alarm signal 212 which is then applied to the fault detector circuit 214.

The fault detector circuit 214 may be impressed with a signal 213 indicating the detection of an abnormality of a production line which has been directly detected by the sequence control system 10, namely by the relay control circuit (PLC control program in the case of PLC), in addition to the sequence step progress error signal 211 and the delay alarm signal 212. Upon the application of these abnormality signals to the fault detector circuit 214, a signal 215 which indicates the detection of a fault is applied to a faulty sequence step identifier circuit 216. At the same time, a fault factor information signal 218 indicating the nature of the fault is applied to a sequence circuit condition display circuit 222.

In response to the fault detection signal 215, the faulty sequence step identifier circuit 216 receives the sequence step progress information 207 from the sequence step memory circuit 203. This information 207 is used to determine which is the final sequence step at which the fault has been detected. The result of determination of the identifier circuit 216 is transferred to the sequence circuit condition dispaly circuit 222 as an information signal 217 which indicates the faulty sequence step.

The sequence circuit condition display circuit 222 identifies an abnormal sequence step on the basis of the faulty sequence step information 217 and the fault factor information signal 218, and then finds the abnormal one among sequence control circuits respectively producing control output signals corresponding to the sequence steps, by referring to the contents of a memory circuit 219 which stores the information relating to all the sequence control circuits. Upon identification of the abnormal control output signal at the time of fault detection, a relay control circuit which produces such a control output is identified by referring to the contents of a sequence program memory circuit 220. The information as to whether the contacts and coils constituting the particular sequence control circuit are in an open or closed state, or in an excited or non-exicted state, is received from the sequence control system 10 in the form of a control input/output point closed/open condition signal 221 for circuit simulation. After that, the circuit diagram of the faulty sequence step showing the open or closed state of the contacts and the excited or non-excited state of the coils is displayed on the CRT display 223 by the known method as shown in FIGS. 2A and 2B. Further, the abnormality factor information 218 indicating the cause of the fault, which is applied to the display circuit 222, may be also displayed on the CRT display 223.

From this displayed information, the operator is able to identify the faulty part and the location thereof.

The foregoing is general description of the fault diagnosis method according to the present invention. The sequence step memory circuit 203, the sequence step skip detector circuit 208 and the faulty sequence step identifier circuit 216 which make up the essential parts of the invention will be described in detail below.

The internal circuit configurations of the sequence step memory circuit 203 and the sequence step skip detector circuit 208 are shown in FIG. 4. The addresses or bits of the sequence step memory circuit 203 are composed of a multiplicity of flip-flops 2031, 2032, . . . , 2033 which correspond to the first, second, third steps and so on, of the predetermined sequence steps respectively.

The sequence control system 10 produces control output signals 2011, 2012, . . . , 2013 representing the predetermined sequence steps respectively. These control output signals 2011, 2012, . . . , 2013 are sequentially produced with the progress of sequence steps, and applied in the order of output production to the corresponding addresses or bits of the memory circuit 203, i.e., to the flip-flops 2031, 2032, . . . , 2033 respectively. In the process, checking is usually made in the manner mentioned below as to whether any flip-flop or process step is skipped or not.

In the embodiment of FIG. 4, the first sequence step control output signal 2011 is first applied to the corresponding one (2021) of a plurality of differentiating circuits 2021, 2022, . . . , 2023 constituting the differentiator circuit 203 (FIG. 3) to detect the rise of the signal 2011. Then the output pulse signal of the differentiating circuit 2021 indicating the rise of the signal 2011 is applied to the set terminal of the corresponding flip-flop 2031. The second sequence step 2012 is similarly applied to the set terminal of the flip-flop 2032 through the corresponding differentiating circuit 2022. Similar processes are repeated for the other signals until the final sequence step 2013 is applied to the set terminal of the corresponding flip-flop 2033. In other words, with the progress of the sequence steps, the flip-flops are set progressively from left to right in sequence. Thus by checking which ones in the flip-flop group 203 are set or reset, it is possible to know the sequence step up to which the progress has been made or whether any skip has been made or not before that step.

The output signal of each of the differentiating circuits 2021, 2022, . . . , 2023, after being OR'ed by the sequence progress signal detector circuit 205 which may be composed of an OR circuit, is applied to the sequence step skip detector circuit 208 as the skip check timing signal 206. In the sequence step skip detector circuit 208, the timing signal 206 is applied as a load signal to the respective terminals L of the addresses or bits 2081 to 2083 of a shift registor circuit 2080. The addresses or bits 2081 to 2083 of the shift register circuit 2080 may be constituted by flip-flops in a known manner. Upon the application of this load signal, data representing the contents of the flip-flops 2031 to 2033 constituting the addresses or bits of the sequence step memory circuit 203 are transferred or copied into the respective addresses or bits 2081 to 2083 of the shift register circuit 2080 correspondingly through the respective terminals D thereof. At the same time, the skip check timing signal 206 is applied as a set signal to the terminal S of a flip-flop 2084, so that an output is produced from the "1" terminal of the flip-flop 2084. The output signal from the "1" terminal of the flip-flop 2084 is applied to one of the two input terminals of an AND gate 2085 thereby to open or enable the same gate 2085. The other input terminal of the AND gate 2085 is impressed with clock pulses produced from a clock pulse generator circuit 2086. So long as the output signal from the "1" terminal of the flip-flop 2084 is applied to the above-mentioned one terminal of the AND gate 2085, namely, so long as the AND gate 2085 is open or enabled, the clock pulses are allowed to pass the AND gate 2085 and applied to the respective terminals S of the addresses or bits 2081 to 2083 of the shift register circuit 2080 as shift pulses for shifting the contents of the addresses or bits of the shift register circuit 2080. Every time the shift pulse is applied, the contents of the addresses or bits 2081 to 2083 of the shift register circuit 2080 are shifted leftward one by one in order.

Figure 5A:
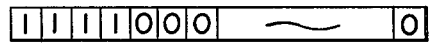
FIGS. 5A and 5B are diagrams showing the information stored in the sequence step memory circuit.

Assume that the sequence steps are followed normally and the fourth step has been accomplished. Under this condition, outputs are produced from the respective "1" terminals of the four bits or flip-flops 2 31, 2032 and so on from the left among the series of flip-flops 203, while the remaining flip-flops do not produce outputs from their "1" terminals. If the status of a flip-flop wherein an output is produced from the "1" terminal thereof and no output is produced on the contrary from the "0" terminal of the same is expressed as logic "1", and the status wherein no output is produced from the "1" terminal and an output is produced on the contrary from the "0" terminal is expressed as logic "0", the contents of the respective flip-flops 2031, 2032, . . . , 2033 are as shown in FIG. 5A. As a result, the logics of the addresses or bits 2081, 2082, . . . , 2083 of the shift register circuit 2080 are also as shown in FIG. 5A. In other words, each of the four addresses or bits 2081, 2082, . . . , from left has a "1" output terminal in the state of logic "1" and a "0" terminal in the state of logic "0", while each of the remaining addresses or bits of the shift register circuit 2080 has a "1" output terminal in the state of logic "0" and a "0" output terminal in the state of logic "1". The respective "1" output terminals of all the addresses or bits 2082 to 2083 except for the leftmost addresses or bits 2081 are connected to the respective inputs of an OR gate 2087 and therefore the OR gate 2087 produces an output. In other words, the output of the OR gate 2087 becomes logic "1". The output logic "1" signal of the OR gate 2087 is applied to one of the two input terminals of an AND gate 2088, while the other input terminal of the AND gate 2088 is connected to the output terminal "0" of the leftmost address or bit 2081. Since the address or bit 2081 is in the state of logic "0", i.e. no output signal is produced from the terminal "0" thereof, however, the AND gate 2088 is not opened and does not produce any output signal. When, with the progress of shifting of the contents of the addresses or bits of the shift register circuit, the status of the leftmost address or bit 2081 becomes logic "0", i.e. the output terminal "0" of the same becomes logic "1" and an output signal is produced from the output terminal "0" of the address or bit 2081. This particular output signal is then applied as a shift end signal to the other input terminal of the AND gate 2088. Since all the remaining addresses or bits 2082 to 2083 are in the state or logic "0" at this time, however, the output signal of the OR gate 2087 is also logic "0", with the result that the AND gate 2088 also does not produce an output. Simultaneously, the logic "1" shift end signal produced at the output terminal "0" of the leftmost address or bit 2081 is applied to the differentiating circuit 2089 by which the rise portion of the same signal is detected. The output pulse signal of the circuit 2089 is applied to the clear terminal "C" of the flip-flop 2084, so that the output terminal "1" of the flip-flop 2084 becomes logic "0", thereby closing the AND gate 2085. When the AND gate 2085 is closed and the output signal thereof becomes logic "0", the shifting operation of the addresses or bits of the shift register circuit 2080 ends.

Figure 5B:
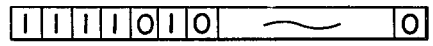

Next, assume that the status of the bits or the flip-flops 2031 to 2033 of the memory 203, and therefore the status of the addresses or bits 2081 to 2083 of the shift register circuit 2080 are as shown in FIG. 5B when progress has been made up to the sixth sequence step. In this case, the fifth sequence step has failed to be accomplished with a skip made from the fourth to the sixth sequence step. Assuming that the skip check timing signal 206 indicating that the sixth step has been issued is applied to the corresponding bit or flip-flop 2084, the AND gate 2085 is opened in such a manner as mentioned above and clock pulses are applied as shift signals to the shift register circuit 2080 thereby to perform the shifting operations. With the arrival of the fourth clock pulse, i.e., upon the completion of four shifts, the status of the leftmost address or bit 2081 of the shift register 2080 becomes logic "0", so that the output terminal "0" thereof becomes logic "1". In other words, the shift end signal is applied to the other input terminal of the AND gate 2088 from the address or bit 2081 to open or enable the AND gate 2088. This shift end signal is also applied, as mentioned above, to the differentiating circuit 2089. The flip-flop 2084 is cleared and the AND gate 2085 is closed, thus ending the shifting operation of the addresses or bits of the shift register circuit 2080. Under this condition, however, it will be apparent that the status of the second address or bit 2082 is logic "1", and therefore the output terminal "1" thereof is also in the state of logic "1", so that an output signal is produced from the output terminal "1". This logic "1" output signal of the address or bit 2082 is applied through the OR gate 2087 to the one input terminal of the AND gate 2088, so that the AND gate 2088 produces an output signal 211. The output signal 211 constitutes the sequence step progress error signal mentioned with reference to FIG. 3. In this way, any occurrence of a skip of sequence step is rapidly and accurately detected.

Figure 6:
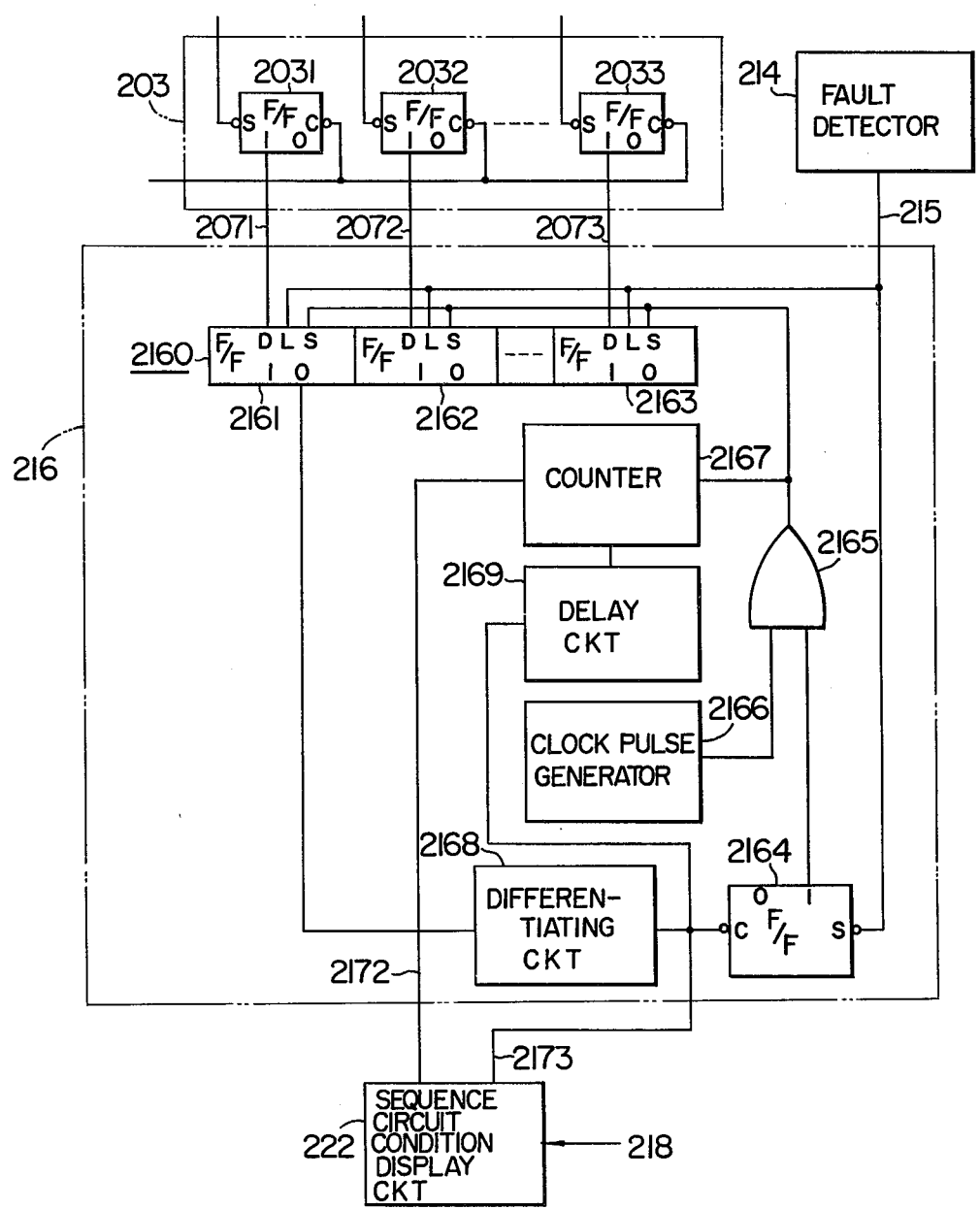
FIG. 6 is a diagram for explaining an embodiment of a sequence step identifier circuit according to the present invention.

Next, the operation of the faulty sequence step identifier circuit 216 will be described with reference to FIG. 6. The faulty sequence step identifier circuit 216 includes also a shift register circuit 2160 composed of addresses or bits 2161, 2162, . . . , 2163, each having a data input terminal D which is connected to the corresponding one of the flip-flops 2031, 2032, . . . , 2033 of the memory circuit 203 respectively. These addresses or bits 2161 to 2163 of the shift register circuit 2160 may be constituted by flip-flops in a known manner as mentioned above. The output terminal of the fault detector circuit 214 is connected to the load terminal L of each of the addresses or bits 2161 to 2163. When the fault detector circuit 214 produces a fault detection signal 215 upon the detection of a fault, this particular signal is applied as a load signal to the load terminals of the addresses or bits 2161 to 2163, so that the addresses or bits 2161 to 2163 receive at the data terminals D thereof the contents of the corresponding flip-flips 2031 to 2033 respectively. At the same time, the fault detection signal 215 is applied to the set terminal S of a flip-flop 2164. Thus the flip-flop 2164 is set and the output terminal "1" thereof changes to the state of logic "1". The resulting output logic "1" signal of the flip-flop 2164 is applied to one of the two input terminals of an AND gate 2165, thus enabling the AND gate 2165, with the result that the clock pulse produced from a clock pulse generator circuit 2166 is allowed to pass the AND gate 2165. The clock pulse that has passed the AND gate 2165 is applied to the shift terminals S of the respective addresses or bits 2161, 2162, . . . , 2163 of the shift register circuit 2160 thus performing the shift operation in a manner similar to that explained with reference to FIG. 4. In other words, only during the period when an output signal is produced from the output terminal "1" of the flip-flop 2164, the shifting operation is performed, and each time of arrival of each clock pulse, the contents of the shift registers 2161, 2162, . . . , 2163 are shifted from right to left one by one in order. The clock pulses that have passed the AND gate 2165 are counted up by a counter 2167.

Assume that the fault detection signal 215 is produced when the status of the respective flip-flops 2031, 2032, . . . , 2033 is as shown in FIG. 5A. This means that a fault other than a step skip has occurred when the order of the fourth sequence step is issued from the sequence control system 10. As described above, every time the clock pulse is applied to the shift terminals of the respective addresses or bits 2161 to 2163, the shifting operation progresses. This shifting operations are repeated until the status of the leftmost address or bit 2161 becomes logic "0". Namely, when the fourth clock pulse is applied to the shift terminals of the respective addresses or bits of the shift register circuit 2160, the status of the leftmost address or bit 2161 becomes logic "0" and the output terminal "0" thereof becomes logic "1", thus producing from this output terminal "0" an output signal indicating the end of shifting operation. This shift end signal is applied to a differentiating circuit 2168 to detect the rise portion thereof. The output pulse signal of the differentiator 2168 indicating the rise portion of the shift end signal is applied as a clear signal to the clear terminal C of the flip-flop 2164, thus terminating the shifting operation in a similar manner to that mentioned with reference to FIG. 4. The output pulse signal of the differentiating circuit 2168 is also applied to the sequence circuit condition display circuit 222 as a signal 2173 indicating the end of fault identification. The sequence circuit condition display circuit 222 receives the output signal 2172 of the counter 2167 indicating the contents thereof, in response to the fault end indicating signal 2173. The contents of the counter 2167 is, as mentioned above, equivalent to the number, four in this case, of clock pulses applied as shift pulses to the respective addresses or bits 2161, 2162, ..., 2163. This number indicates which sequence step has an abnormality. Namely, in the present case, the fourth step has a fault.

The output pulse signal of the differentiating circuit 2168 is applied also to the counter 2167 as a reset signal through a delay circuit 2169 after being delayed for a predetermined period of time by the delay circuit 2169, thus resetting the counter 2167.

A faulty control circuit is looked for subsequently following the same procedures as those mentioned above, so that the on or off conditions of the contacts and coils making up the control circuit are displayed on the CRT display screen.

A faulty step is identified in quite the same manner as mentioned above with reference to FIG. 5A also in the case where the contents of the flip-flops 2031, 2032, ..., 2033 are as shown in FIG. 5B, i.e., the abnormality is a skip of sequence step. In this case, the status of the leftmost address or bit 2161 of the shift register circuit 2160 is changed from logic "1" to "0" in response to the fourth clock pulse, and a logic "1" signal is produced from the output terminal "0" thereof, thus ending the shifting operation. The sequence circuit condition display circuit 222 is notified of the contents of the counter 2167, i.e., counted number "4" in this case. Since the fault factor information signal 218 produced from the fault detector circuit 214 (FIG. 3) indicates that the fault is a skip of a sequence step, it is determined that the abnormal step, i.e., the sequence step skipped is the fifth sequence step. The subsequent processes of operation are similar to those mentioned already.

It will be easily appreciated that the present invention is also applicable to the software of a known electric computer. In this case the functions of all the circuits constituting the fault detector 20 and the functions of all the circuits constituting the fault diagnosis display section 30 except for the CRT 223 are effected by the computer in accordance with a program preset in the computer.

We claim:

1. A method for diagnosing a fault in a sequence control system controlling an object by applying a plurality of predetermined sequence steps in accordance with a predetermined sequence, said method comprising the steps of:
preparing memory means having a plurality of addresses or bits corresponding to the respective ones of said plurality of predetermined sequence steps;
storing the issued sequence step in the corresponding one of said addresses or bits of said memory means every time said sequence steps are issued from said sequence control system one by one in accordance with said predetermined sequence for application to said object to be controlled;
checking the stored contents of said memory means every time said sequence steps are issued from said sequence control system one by one in accordance with said predetermined sequence for application to said objects to be controlled; and
determining that a fault is present when a skip of a sequence step is detected by said checking step and identifying said particular faulty sequence step.

2. A method for diagnosing a fault according to claim 1, further comprising a step of displaying the condition of a control circuit associated with said faulty sequence step.

3. A method for diagnosing a fault according to claim 1, further comprising a step of determining a fault when the time intervals between adjacent sequence steps applied to said object successively in accordance with said predetermined sequence exceed a predetermined length of time and determining said faulty sequence step based on the contents stored in said memory means under that condition.

4. A method for diagnosing a fault according to claim 3, further comprising a step of displaying the condition of a control circuit associated with said faulty sequence step.

5. An apparatus for diagnosing a fault in a sequence control system controlling an object by application of a plurality of predetermined sequence steps in accordance with a predetermined sequence, said apparatus comprising:
memory means having a plurality of addresses or bits corresponding to the respective ones of said plurality of predetermined sequence steps;
first means, for each time said sequence steps are issued from said sequence control system one by one in accordance with said predetermined sequence so that they are applied to said object to be controlled, for detecting the issued sequence step and for introducing said detected sequence step into the corresponding one of said addresses or bits of said memory means so as to be stored therein;
second means for checking the stored contents of said memory means in response to the detection by said first means of said issued sequence step to be applied to said object to thereby check whether any one of said sequence steps to be applied to said object has been skipped, said second means producing an output signal when a skip of a sequence step is detected;
third means for generating an output signal indicating a fault in response to the output signal of said second means; and fourth means for identifying the sequence step associated with the occurrence of said fault in response to said output signal of said third means.

6. An apparatus for diagnosing a fault according to claim 5, further comprising fifth means operatively connected to said first means for producing an output signal when the time interval between adjacent ones of the sequence steps successively applied to said object to be controlled exceeds a predetermined length of time, said third means producing the output signal indicating occurrence of a fault in response not only to the output signal of said second means but also to the output signal of said fifth means.

7. An apparatus for diagnosing a fault according to claim 6, further comprising sixth means for displaying the condition of a control circuit associated with said faulty sequence step in response to said identification of said faulty sequence step by said fourth means.

8. An apparatus for diagnosing a fault according to claim 5, in which said memory means has a series of addresses or bits in a number equal to that of said plurality of predetermined sequence steps, said addresses or bits being arranged so as to correspond, one by one in order from one end of said series to the other, to said plurality of sequence steps one by one in order of application of said sequence steps to said object.

9. An apparatus for diagnosing a fault according to claim 8, in which each of said sequence steps is applied to said object in the form of an electrical signal, said first means including differentiating circuit means for generating a pulse signal in response to the commencement of said electrical signal and means for applying said pulse signal generated by said differentiating circuit means to one of said addresses or bits of said memory means corresponding to the sequence step associated with said pulse signal, each of said addresses or bits being adapted to change the logic condition of the content thereof from one state to the other in response to the application of said pulse signal; in which said second means includes first shift register means having a series of addresses or bits in the same number as those of said memory means, said series of addresses or bits of said first shift register means corresponding, one by one in order from one end of said series to the other, to said series of addresses or bits of said memory means one by one in order from said one end thereof to said other end, the logic condition of the content of each of said addresses or bits of said first shift register means being adapted to change between one state and another, said first shift register means being adapted to copy the logic condition of said respective addresses or bits of said memory means into the corresponding ones of said addresses or bits of said first register means in response to the application of a first load signal to said first shift register means, said first shift register means being so arranged that the logic condition of said respective addresses or bits shifts one by one in the direction from said other end to said one end every time a first shift signal is applied to said first shift register means, said second means further including first shift signal generator means for generating said first shift signal, means responsive to the generation of said pulse signal by said differentiating circuit means for applying said pulse signal as said first load signal to said first shift register means and simultaneously for applying said pulse signal as a set signal to said first shift signal generator means to cause said first shift signal generator means to commence to produce a series of first shift signals and to successively apply them to said first shift register means, first reset signal generator means for generating a first reset signal for disabling said first shift signal generator means in response to the recovery of the logic condition of specific one of said series of addresses or bits of said first register means at said one end thereof from said other state to said one state as a result of successive application of said first shift signals to said first shift register means, and skip signal generator means for generating an output signal indicating occurrence of a skip of sequence step in response to the fact that the logic condition of at least one of said series of addresses or bits of said first shift register means except for said specific address or bit at said one end thereof is in said other state after said first shift signal generator means has been disabled; in which said third means is adapted to simultaneously generate a first output signal indicating occurrence of a fault and a second output signal indicating the fact that said fault is a skip of a sequence step, in response to the output signal of said skip signal generator means; in which said fourth means includes second shift register means having a series of addresses or bits in the same number as those of said memory means, said series of addresses or bits of said second shift register means corresponding, one by one in order from one end of said series to the other to said series of addresses or bits of said memory means one by one in order from said one end thereof to said other end, the logic condition of the content of each of said addresses or bits of said second register means being adapted to change between one state and another, said second shift register means being adapted to copy the logic condition of said respective addresses or bits of said memory means into the corresponding ones of said addresses or bits of said second register means in response to the application of said load signal to said second shift register means, said second shift register means being so arranged that the logic condition of said respective addresses or bits of said second shift register means shifts one by one in the direction from said other end to said one end every time a second shift signal is applied to said second shift register means, said second means further including second shift signal generator means for generating said second shift signal, means for applying said first signal of said third means as said second load signal to said second shift register means and simultaneously for applying said first output signal of said third means as a set signal to said second shift signal generator means to cause said second shift signal generator means to commence to produce a series of second shift signals and to successively apply them to said second shift register means, second reset signal generator means for generating a second reset signal for disabling said second shift signal generator means in response to the recovery of the logic condition of specific one of said series of addresses or bits of said second register means at said one end thereof from said other state to said one state as a result of successive application of said second shift signals to said second shift register means, means for counting said second shift signals generated for the period from the setting of said second shift signal generator means to the disabling of the same, and means for generating an output signal representing a sequence step associated with the occurrence of said fault on the basis of the count made by said counter.

10. An apparatus for diagnosing a fault according to claim 9, further comprising timer means which is set in response to each generation of said pulse signal by said differentiating circuit means, said timer means being so arranged that it is reset when the next pulse signal is generated by said differentiating circuit means before the lapse of a predetermined length of time after the setting by the preceding pulse signal but it produces an output signal when the next pulse signal fails to be generated before the lapse of said predetermined length of time after the setting by the preceding pulse signal, said third means simultaneously generating a third output signal indicative of occurrence of a fault and a fourth output signal indicating the fact that said fault is accompanied by a delay of sequence step, in response to the output signal of said timer means.

11. An apparatus for diagnosing a fault according to claim 5, further comprising means operatively connected to said fourth means for displaying the condition of a control circuit associated with the faulty sequence step in response to the identification of said faulty sequence step by said fourth means.

12. An apparatus for diagnosing a fault according to claim 9, in which said fourth means further includes delay reset means for resetting said counter means after delay of a predetermined length of time following the resetting of said second shift signal generator means.

* * * * *